United States Patent [19]

Watanabe et al.

[11] Patent Number: 5,669,013

[45] Date of Patent: Sep. 16, 1997

[54] **SYSTEM FOR TRANSFERRING M ELEMENTS X TIMES AND TRANSFERRING N ELEMENTS ONE TIME FOR AN ARRAY THAT IS X*M+N LONG RESPONSIVE TO VECTOR TYPE INSTRUCTIONS**

[75] Inventors: Akira Watanabe, San Jose; Dinesh C. Maheshwari, Santa Clara; Bruce T. McKeever, Cupertino; Madian Somasundaram, San Jose, all of Calif.

[73] Assignee: Fujitsu Limited, Japan

[21] Appl. No.: 310,683

[22] Filed: Sep. 22, 1994

Related U.S. Application Data

[63] Continuation-in-part of Ser. No. 131,758, Oct. 5, 1993, abandoned.

[51] Int. Cl.$^6$ ........................................................ G06F 7/00
[52] U.S. Cl. .................... 395/825; 395/800.06; 395/563; 395/670; 364/232.21; 364/931.51; 711/100
[58] Field of Search .................................. 395/800, 375, 395/287

[56] References Cited

U.S. PATENT DOCUMENTS

| | | | |
|---|---|---|---|
| 4,661,900 | 4/1987 | Chen et al. | 395/800 |
| 4,760,518 | 7/1988 | Potash et al. | 395/287 |
| 4,760,545 | 7/1988 | Inagami et al. | 364/200 |
| 4,901,230 | 2/1990 | Chen et al. | 395/476 |
| 4,964,035 | 10/1990 | Aoyama et al. | 395/800 |
| 5,123,095 | 6/1992 | Papadopoulos et al. | 395/375 |
| 5,201,058 | 4/1993 | Kinoshita et al. | 395/800 |
| 5,226,171 | 7/1993 | Hall et al. | 395/800 |
| 5,261,113 | 11/1993 | Jouppe | 395/800 |
| 5,349,677 | 9/1994 | Cray et al. | 395/800 |
| 5,418,973 | 5/1995 | Ellis et al. | 395/800 |
| 5,430,884 | 7/1995 | Beard et al. | 395/800 |
| 5,437,043 | 7/1995 | Fujii et al. | 395/800 |
| 5,530,881 | 6/1996 | Inagami et al. | 395/800 |

FOREIGN PATENT DOCUMENTS

| | | |
|---|---|---|
| 0167959 | 1/1986 | European Pat. Off. . |
| 0205809 | 12/1986 | European Pat. Off. . |

OTHER PUBLICATIONS

Jouppi, et al., "A Unified Vector/Scalar Floating–Point Architecture", Computer Architecture News, No. 2, Apr. 1989, pp. 134–143.

Primary Examiner—Christopher B. Shin
Assistant Examiner—Anderson I. Chen
Attorney, Agent, or Firm—Christie, Parker & Hale, LLP

[57] ABSTRACT

A plurality of special multi-element registers, called "vector registers" herein, are incorporated into a scalar computer. The vector registers are controlled to sequence the transfer of vector data between a main memory and a processing unit of the computer to occur one element at a time until an entire array of vector data has been processed. The vector registers operate concurrently with the processing unit and the main memory. A common address scheme is used between the vector registers and the scalar registers of the computer so the vector registers are visible in the scalar register address space. Pointers are used in the vector registers to keep track of the order of the array elements during processing. Vector registers are used to store intermediate results of the vector processing operations.

21 Claims, 6 Drawing Sheets

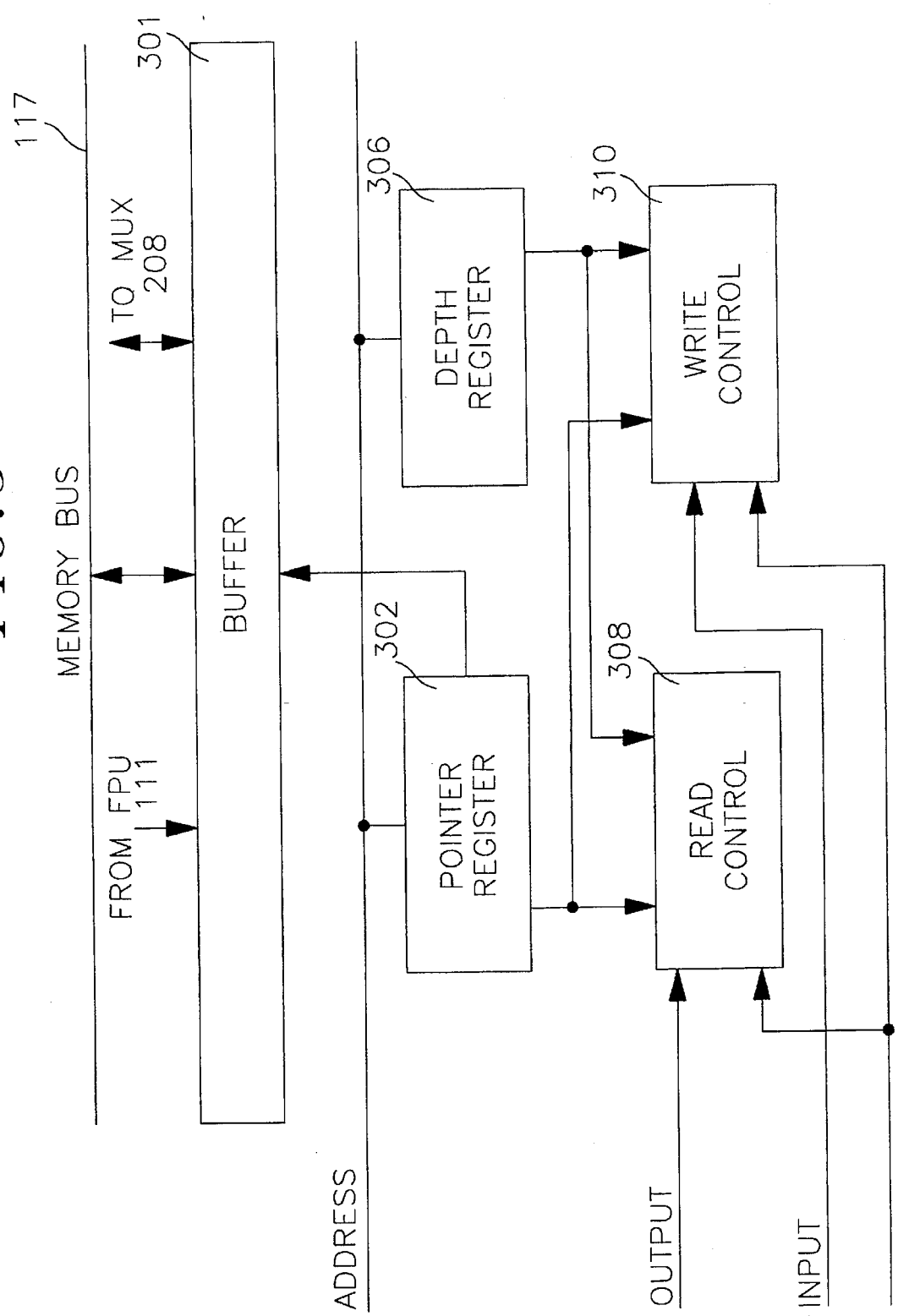

SYSTEM FOR TRANSFERRING M ELEMENTS X TIMES AND TRANSFERRING N ELEMENTS ONE TIME FOR AN ARRAY THAT IS X*M+N LONG RESPONSIVE TO VECTOR TYPE INSTRUCTIONS

CROSS REFERENCE TO RELATED APPLICATIONS

This application is a continuation-in-part of application Ser. No. 08/131,758, filed on Oct. 5, 1993, now abandoned the disclosure of which is incorporated fully herein by reference.

BACKGROUND OF THE INVENTION

This invention relates to high-speed processing of vector data and, more particularly, to a computer system and method that uses special multi-element registers, called "vector registers" to enhance vector processing operations.

Data processing operations can be classified as scalar, vector, or mixed. In scalar processing, the elements of scalar data are independent of each other as to their nature and the calculations or operations to be performed. In vector processing, the elements of vector data are arranged in arrays. The elements of an array are the same in nature and generally are each subjected to the same calculations or operations. Vector processing generally handles massive amounts of data to arrive at a result. A typical example of vector data is a matrix subjected to a mathematical operation.

One important application of vector processing is in the field of computer graphics. Typical applications include laser printers, digital copiers, video games, and three-dimensional image processors used for medical diagnostics. For example, in this setting vector operations upon matrices can be used to perform coordinate transformation.

Use of a computer designed to process scalar data for vector operations results in processing delays and slow overall throughput. For one thing, much of the time the processor has to wait while large arrays of vector data are being transferred element by element between the processing unit and the main memory of the computer. For another thing, valuable processor time is consumed generating an address for every element of the vector data transferred to the main memory. In addition, it is difficult to program such a scalar computer to perform vector operations in a high level language. As a result, much time consuming hand coding is required. For this reason, it has been common practice in the past to employ a dedicated computer to process vector data.

SUMMARY OF THE INVENTION

According to the invention, a plurality of special multi-element registers, called "vector registers" herein, are incorporated into a scalar computer. The vector registers are controlled to sequence the transfer of vector data between a main memory and a processing unit of the computer to occur one element at a time until an entire array of vector data has been processed.

A feature of the invention is the use of the vector registers to operate concurrently with the processing unit and the main memory. Specifically, vector data is being transferred between one group of vector registers and the processing unit to operate upon the vector data in the processing unit in the foreground, while vector data is being transferred between another group of vector registers and the main memory to make available vector data in the background. As a result, the time that the processing unit must wait to receive vector data from or transmit vector data to the main memory is substantially cut and the throughput is accordingly raised.

Another feature of the invention is a use of a common address scheme between the vector registers and the scalar registers of the computer so the vector registers are visible in the scalar register address space. Specifically, the vector registers are assigned the same addresses as some of the scalar registers. During vector processing, these addresses are mapped to the vector registers, which are unused during scalar processing. During scalar processing these addresses are mapped to the scalar registers which are unused during vector processing. As a result, it is easier to program the computer system in a high level language because the addresses can be designated from a compiler, in which the high level language is automatically converted to machine readable language.

Another feature of the invention is the use of pointers in the vector registers to keep track of the order of the array elements during processing. Consequently, vector data remains in the vector registers until the entire array or portion of the array stored therein has been processed, at which time such vector data, if a result to be saved, may be transmitted to the main memory. As a result, the processor is not burdened with the job of generating main memory addresses for the individual vector data elements.

Another feature of the invention is the use of a vector register to store intermediate results of the vector processing operations. Specifically, first and second vector registers are connected between the main memory and the processing unit to transfer arrays of vector data therebetween. First, unprocessed vector data is transferred from the first register to the processing unit. Second, processed vector data is transferred from the processing unit to the second register. Third, processed vector data is transferred from the second register to the processing unit. Finally, re-processed vector data is transferred from the processing unit to one of the registers other than the second register. Thus, the second register is used to store an intermediate result of the operation, thereby eliminating a main memory store operation.

BRIEF DESCRIPTION OF THE DRAWINGS

FIG. 5 is a block diagram of one of the vector registers and its attendant control circuitry.

DESCRIPTION OF THE PREFERRED EMBODIMENT

Figure 1:
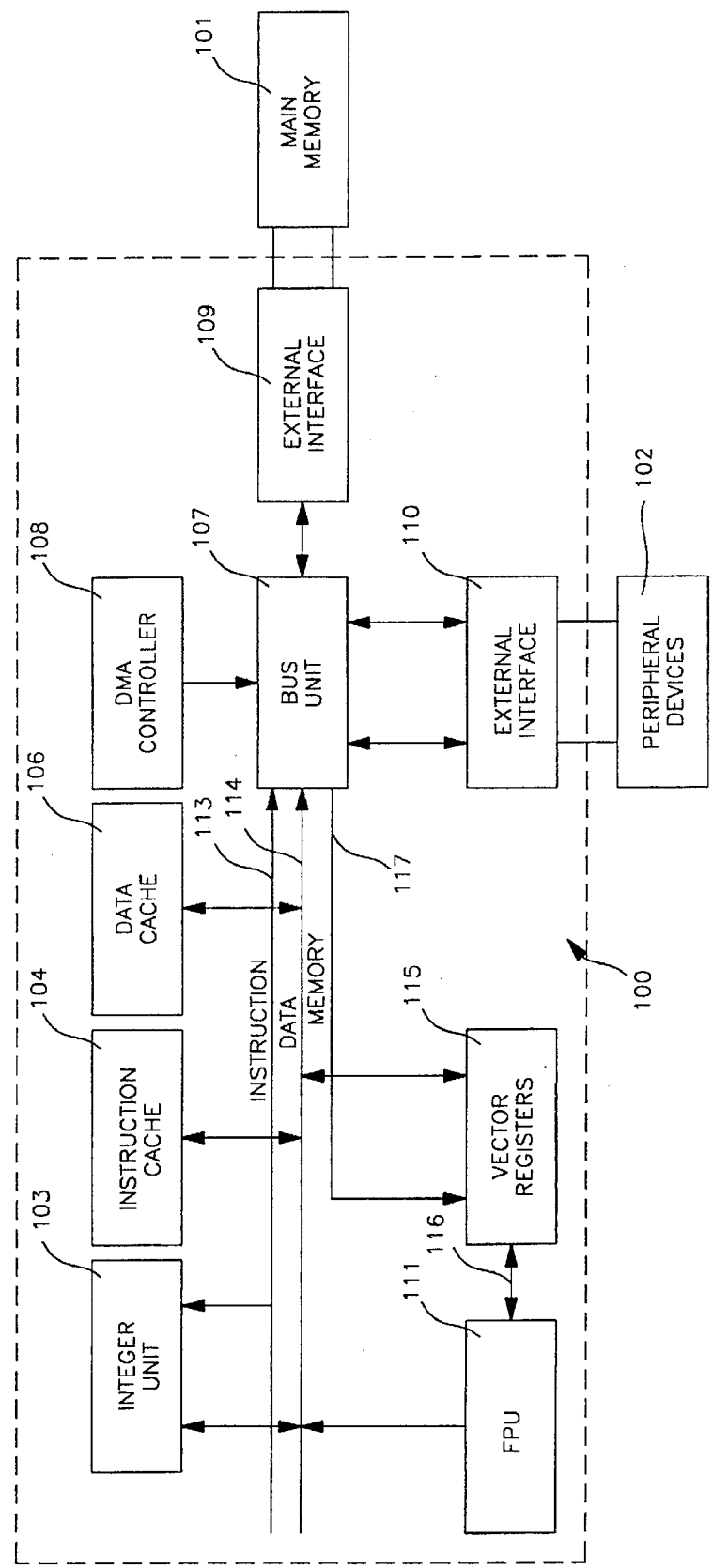
FIG. 1 is a block diagram of a computer system that incorporates the principles of the invention.

In FIG. 1, a computer system such as a mainframe computer, a work station, or a personal computer, has a central processing unit (CPU) 100, which is preferably implemented on a single semiconductor chip, a main memory 101, and peripheral devices 102. To facilitate discussion and understanding of the present invention, CPU 100 is assumed to have the SPARC architecture as described in "The Sparc Architecture Manual", Version 8, by SPARC International, Inc., Prentice Hall, 1992, the contents of which is incorporated herein by reference.

CPU 100 comprises an integer unit (IU) 103, an instruction cache 104, a data cache 106, a direct memory access (DMA) controller, 108, a bus control unit (BCU) 107, external interfaces 109 and 110, and a floating point unit (FPU) 111. Hardware-wise, these components are incorporated in commercially available CPU's. External interface 109 is connected between CPU 100 and main memory 101 to serve as a memory bus interface therebetween. External interface 110 is connected between CPU 100 and peripheral devices 102 to serve as a peripheral bus interface therebetween. For the purpose of discussion, it is assumed that CPU 100 operates on thirty-two bit words and data paths between CPU 100, main memory 101, and the peripheral devices are sixty-four bits wide. It will be understood, however, that these specific values are only a design choice for the preferred embodiment and are mentioned to facilitate understanding of the present invention and should in no way be considered as a limitation on the application of the present invention.

CPU 100 has an instruction bus 113 connected to BCU 107, instruction cache 104, and IU 103, and a data bus 114 connected to BCU 107, IU 103, and FPU 111.

Bus control unit (BCU) 107 operates to arbitrate the various requests for memory operations (instruction fetch, operand load/store, DMA request, etc.). In well known fashion, BCU 107 decides which requests to serve and the order in which they will be served and also determines which bus interface (i.e. peripheral bus interface 110 or memory bus interface 109) will service a request. Because the width of the memory bus (64 bits) is equal to twice the width of the computer's words (32 bits), the memory bus can be divided into two channels for performing memory access operations, i.e. a 32-bit channel 0 and a 32-bit channel 1.

Memory operations can be performed through conventional direct memory access under the control of DMA controller 108. DMA controller 108 has a status bit for each memory channel which is set when a DMA operation for that memory channel is done. This bit is part of a DMA status register provided for each channel. In the preferred embodiment, the status registers are respectively assigned SPARC ASR (Ancillary State Register) addresses of ASR 18 and ASR 19.

The DMA 108 also supports buffer-chained direct memory access operations. Buffer-chained DMA allows an application program to set up more than one DMA at the beginning of a set of operations on a long vector. Buffer-chained DMA operations are performed by recording the parameters of the DMA operations in a linked list, a pointer is provided to point to the parameters of the current DMA operation. When one DMA operation finishes, the pointer is advanced to perform the next DMA operation on the list.

In addition to the status registers, each DMA channel has a descriptor pointer which is used in a chaining mode to point to the next element of the linked list. In the preferred embodiment, the ASI part of the descriptor pointer of channel 0 is mapped into SPARC address space ASI=0×1 address 0×180 and the descriptor pointer of channel 1 is mapped into SPARC address space ASI=0×1 address 0×1A0. In addition to the above, each DMA channel has a source/destination ASI register for specifying the SPARC address space for the DMA, a source address register, a destination address register, byte count register and a channel control register. These registers are also mapped into different memory locations. For example, the "source/destination ASI" registers for channels 0 and 1 are respectively mapped to SPARC ASI 0×1 locations 0×180 and 0×1A0, the "source address" registers are mapped to ASI 0×1 locations 0×184 and 0×1A4, the "destination address" registers are mapped to ASI 0×1 locations 0×188 and 0×1A8, the "byte count" registers are mapped to ASI 0×1, location 0×18C and 0×1AC, and the channel control registers are mapped to ASI 0×1 locations 0×194 and 0×1B4. The address parts of the descriptor pointers are mapped to ASI 0×1, locations 0×190 and 0×1B0.

The IU 103 is responsible for executing integer arithmetic instructions. The IU 103 also controls the overall operation of the CPU 100, including the execution of integer, logical and floating point instructions (although it does not execute the floating point instructions). For example, the IU 103 is responsible for generating addresses and fetching instructions in memory to be executed by the CPU 100 as well as initiating operand fetches during execution of instructions loading and storing of operands from/into the memory.

Instructions are fetched by the IU 103 from an instruction cache 104 or main memory 101 via an instruction bus 113. In the preferred embodiment, the instruction cache 104 is an 8K-byte 2-way set associative cache with 8-word lines each of which can be locked individually and the width of the instruction bus 113 is thirty two bits. Data are fetched by the IU 103 from a data cache 106 via a data bus 114. In the preferred embodiment, the data cache 106 is a 2-way set associative cache with 4 word lines and the data bus is sixty-four bits wide.

Both instruction cache 104 and data cache 106 can be locked individually. When a required instruction or data is missing from the cache, four words, containing the required instruction or data, are fetched from the main memory, replacing a selected entry in the cache. When an entry is locked, however, it is not replaced in a cache miss. This allows the user to lock critical code in the cache. When a data cache entry is locked it behaves as local memory because any writes to these locations will not go to main memory.

Floating point operations are performed by FPU 111. These may include data format conversion, move, square root, add, subtract, multiply, divide, and compare operations as defined in SPARC version 8 architecture. In accordance with the SPARC architecture, floating point calculations are register-to-register operations operating upon the floating point registers. Also in accordance with the SPARC architecture, thirty-two 32-bit floating-point registers f0–f31 are provided in FPU 111. Single-precision values, occupy one register, double-precision values occupy an even-odd pair of registers, and quad-precision values occupy a quad-aligned group of 4 registers. Since more than one word can be processed at a time, the word "element" is used herein to denote the lowest order of data unit handled by CPU 100, e.g. in single precision operation, an element is a 32-bit word, in double precision operation, an element is a 64-bit unit, etc. The SPARC architecture provides a co-processor instruction set to support "co-processor" operations in CPU 100. These co-processor operations can be defined by a designer of CPU 100. For example, the co-processor instruction set may include load and store instructions for moving data between the co-processor registers and main memory. The co-processor instruction set has an address space for accessing a set of co-processor registers. The configuration of the co-processor registers is also definable by the computer designer.

As described to this point the computer system is conventional. According to the invention, a plurality (e.g. six) of special registers 115, called "vector registers" herein, are incorporated into CPU 100 to accommodate vector data. In practice, each vector register may be a two dimensional (64×32), single port, RAM array with a pointer to mark the element position to be written into or read out of. The pointer starts at "the head of the vector register" at the beginning of an operation on an array, advancing one element position each time an element is written in or read out to keep track of the array elements. After the pointer reaches the last element position, it returns to the head of the vector register. A memory bus 117 is connected to BCU 107 and vector registers 115.

The vector data is arranged in arrays of elements (32-bit words for single precision). Preferably, vector operations are executed by a set of instructions having the same format as the scalar floating point instructions. In any case, the two sets of instructions have a field coded to identify the type of instruction, vector or scalar, and, as described below, addresses that are mapped to the vector registers during vector operations and to the floating point registers, hereafter called "scalar registers" to distinguish them from the vector registers, during scalar operation. As a result, general purpose scalar processing and vector processing can be carried out seamlessly with instructions having the same format, and, if desired, with the same hardware. Preferably, some of the operation codes of the floating point instruction set are used to implement the instructions for the vector type operations. Typical, such vector operations are computational operations such as adding two vectors, multiplying one vector with a scalar number, and/or multiplying one vector with another vector, etc.

To reduce hardware, the circuitry for executing the vector type operations are preferably incorporated into FPU 111. Vector registers 115 are connected to FPU 111 by a bus 116 for this purpose. (It will be understood that the vector type operations can also be executed by a circuitry separate from the floating point unit without departing from the general scope of the present invention.) For example, scalar registers f0–f19 in FPU 111 are also preferably used to carry out the vector type operations. These twenty scalar registers may also function as general purpose registers, for example, for storing constants or temporary variables.

Figure 2:
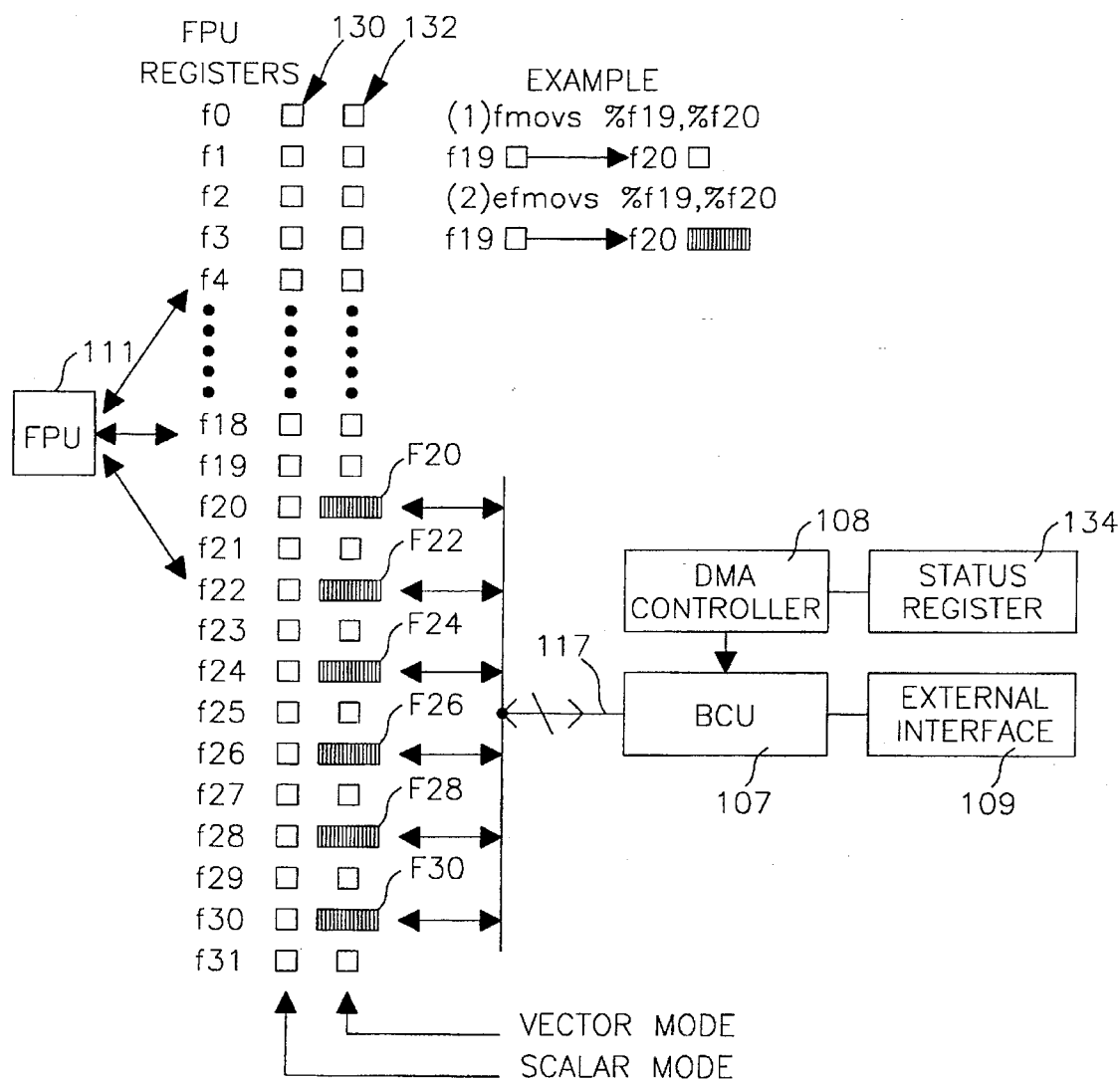
FIG. 2 is a schematic diagram illustrating the mapping of vector and scalar register addresses in the address space of the computer system of FIG. 1.

The interrelationship between vector registers 115 and CPU 100 is further illustrated in FIG. 2. The thirty two floating point (scalar) registers, namely registers f0 to f31, operating in the scalar mode are represented by a row 130. In the vector mode, scalar registers f20, f22, f24, f26, f28, and f30 are replaced by vector registers F20, F22, F24, F26, F28, and F30, which are assigned the same addresses as the corresponding scalar registers, i.e., vector register F20 is assigned the same address as scalar register f20. This is represented by a row 132, in which scalar registers f0 to f19, f21, f23, f25, f27, f29, and f31 are the same registers shown in row 130. When a scalar arithmetic or load instruction is executed, FPU 111 accesses those scalar registers f0 to f31 to which the instruction addresses are mapped. When a vector arithmetic instruction is executed, FPU 111 accesses those scalar registers f0 to f19, f21, f23, f25, f27, f29, and f31 and those vector registers F20, F22, F24, F26, F28, and F30 to which the instruction addresses are mapped.

Since the same addresses are used in both modes of operation, the vector registers are so to speak "visible in the scalar register address space", which facilitates programming of the computer in a high level language, because the compiler can designate vector register addresses during vector operation.

Two example instructions are depicted in FIG. 2. Example (1) is an instruction called "fmovs", which stands for a regular, i.e., scalar operation move of single precision data from register f19 to register f20. Example (2) is an instruction called "efmovs", which stands for an enhanced, i.e., vector operation move of single precision data from register f19 to register F20. In the vector mode, while FPU 111 is operating, so to speak "in the foreground", upon data in the scalar and vector registers, i.e. those of row 132, to which the addresses of the present vector instruction are mapped, DMA controller 108 is supervising the transfer of the vector data results of the previous arithmetic operation from one or more vector registers to main memory 101 via memory bus 117, BCU 107, and external interface 109 or the transfer of new data for the next arithmetic operation from main memory 101 to one or more vector registers via the same route, so to speak "in the background". The direct transfer of data between the vector registers and main memory 101 is controlled by instructions stored in DMA controller 108. When a DMA transfer is completed, a status register 134 is set. FPU 111 or IU 103 monitors status register 134 and pauses after completing an operation until status register 134 indicates that the concurrent DMA transfer has been completed. When a new DMA transfer begins, status register 134 is reset.

If an array of vector data to be processed is larger than the vector registers, some of the vector registers can carry out arithmetic operations in the foreground on a portion of the array equal to the element capacity, i.e., depth, of the vector registers, while other vector registers are being used in the background for DMA transfer of another portion of the array to or from main memory 101, using conventional, well known DMA transfer techniques. The described concurrent operation in the foreground and background greatly diminishes the time that FPU 111 must wait for vector data to process and thus speeds up throughput of processed vector data.

Several examples of the operation of the computer in the vector mode are now set forth.

In the first example, the arithmetic operation Z=A*X+Y is performed, where A is a single constant value and X, Y, and Z are arrays of vector data. It is assumed that the lengths of vector data arrays X, Y, and Z are several hundred words, substantially exceeding the capacity of a single vector register. First, the scalar value A is read into scalar register f0. The lengths of the vector registers are set to sixty four words, the depth of these registers. The first sixty four words of vector data arrays X and Y are then read into vector registers F20 and F22 respectively, using a DMA transfer.

In the foreground, vector multiplications (A*X) equivalent to sixty four vector lengths are performed consecutively using an extended single-precision floating-point multiplication instruction (EFMULs) sixty four times and the result is stored in vector register F30. Concurrently, in the background the next sixty four words of vector data arrays X and Y are read into vector registers F24 and F26 respectively, using a DMA transfer.

| | |
|---|---|
| EFMULs | % f0, % F20, % F30 |
| EFMULs | % f0, % F20, % F30 |
| EFMULs | % f0, % F20, % F30 |
| . | |
| . | |
| EFMULs | % f0, % F20, % F30 |
| EFMULs | % f0, % F20, % F30 |

Next, vector additions (A*X+Y) equivalent to sixty four vector lengths are performed consecutively using an extended single-precision floating-point addition instruction (EFADDs) sixty four times and the result is stored in vector register F20.

| EFADDs | % F30, % F22, % F20 |
|---|---|
| EFADDs | % F30, % F22, % F20 |
| EFADDs | % F30, % F22, % F20 |
| . | |
| . | |
| EFADDs | % F30, % F22, % F20 |
| EFADDs | % F30, % F22, % F20 |

Next, after confirming the termination of background DMA, vector multiplications (A*X) equivalent to the next sixty four vector lengths are performed consecutively using an extended single-precision floating-point multiplication instruction sixty four times in the foreground and the result is stored in vector register F30. At the same time, in background, the vector register F20 containing the previous result is written into the top of vector Z using DMA, and the next sixty four words of vector X and Y are then read into vector registers F20 and F22 respectively.

| EFMULs | % f0, % F24, % F30 |
|---|---|
| EFMULs | % f0, % F24, % F30 |
| EFMULs | % f0, % F24, % F30 |
| . | |
| . | |
| EFMULs | % f0, % F24, % F30 |
| EFMULs | % f0, % F24, % F30 |

Next, vector additions (A*X+Y) equivalent to the next vector length are performed consecutively using an extended single-precision floating-point addition instruction sixty four times.

| EFADDs | % F30, % F26, % F24 |
|---|---|
| EFADDs | % F30, % F26, % F24 |
| EFADDs | % F30, % F26, % F24 |
| . | |
| . | |
| EFADDs | % F30, % F26, % F24 |
| EFADDs | % F30, % F26, % F24 |

This operation is repeated as many times as necessary to proceed through the entire array.

The above interleave can be summarized as follows:

Foreground: FPU    $F30 = f0*F20, F20 = F30 + F22$    (1)
    $(AX = A*X), \quad (Z = AX + Y)$
Background: DMA $F24 \rightarrow$ memory, $F24 \leftarrow$ memory, $F26 \leftarrow$ memory Foreground: FPU    $F30 = f0*F24, F24 = F30 + F26$    (2)
    $(AX = A*X), \quad (Z = AX + Y)$
Background: DMA $F20 \rightarrow$ memory, $F20 \leftarrow$ memory, $F22 \leftarrow$ memory (1) and (2) above are repeated as many times as necessary to process all the elements of vector data arrays X and Y. Alternatively, the results of the calculations could be stored in other vector registers.

Another example uses one vector register to calculate a convolution. Processing is performed smoothly by combining vector registers and a scalar processor, but not with vector registers combined with a vector processor.

The linear convolution is calculated as follows:

$$o[t] = k[0]*i[t] + k[1]*i[t-1] + \ldots + k[n]*i[t-n],$$

where k is the kernel of convolution and has a depth of n+1, i[t] indicates input at specific time t, and o[t] indicates output at this specific time t. There are a number of outputs at varying degrees of completion. The output at time t (i.e., o[t]) is complete as soon as the input i[t] is processed. At this time, i.e. time t, the output at time t+n, i.e., o[t+n] is just starting. This expression can be represented as follows:

$$\begin{aligned}
o[t] &= k[0]*i[t] + o[t] \\
o[t+1] &= k[1]*i[t] + o[t+1] \\
&\cdot \\
&\cdot \\
o[t+n-1] &= k[n-1]*i[t] + o[t+n-1] \\
o[t+n] &= k[n]*i[t]
\end{aligned}$$

Input i[t] at a specific time is assumed to be read into scalar register f0. Output o[t] at a specific time is assumed to be written from scalar register f2.

Additionally, the kernel is assumed to have been read into vector register F30. Vector registers F20 and F22 are used in an interleaved manner from o[t] to o[t+n−1]. The processing results are as follows:

| load | f0 | (1) |
|---|---|---|
| f2 | = F30*f0 + F20 | |
| F22 | = F30*f0 + F20 | |
| F22 | = F30*f0 + F20 | |
| . | | |
| . | | |
| F22 | = F30*f0 + F20 | |
| F22 | = F30*f0 | |
| store | f2 | |
| load | f0 | (2) |
| f2 | = F30*f0 + F22 | |
| F20 | = F30*f0 + F22 | |
| F20 | = F30*f0 + F22 | |
| . | | |
| . | | |
| F20 | = F30*f0 + F22 | |
| F20 | = F30*f0 | |
| store | f2 | |

Processes (1) and (2) above are repeated as many times as necessary. In this application, the background DMA is only used to load the kernal vector into the vector register at the start of the process. The other vector registers are used to hold the accumulating convolution values.

Further additional examples of the operation of the invention are set forth in Appendices A, B, and C attached hereto. In these appendices, vector registers F20, . . ., F30 are designated f[A], . . ., f[F], respectively.

Figure 3:
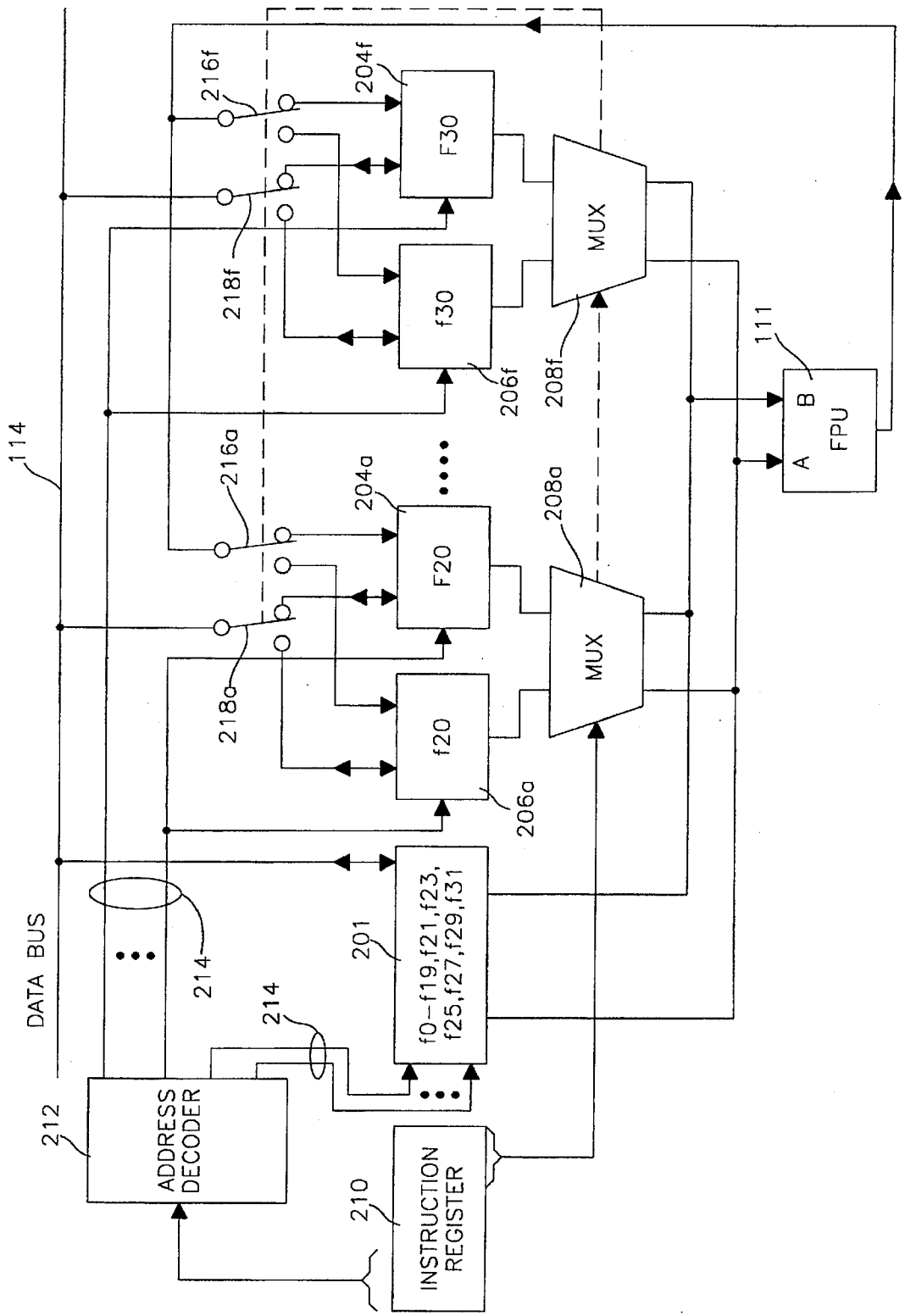
FIG. 3 is a block diagram illustrating how the vector and scalar registers are connected to the remainder of the computer system of FIG. 1.

FIG. 3 illustrates in more detail how vector registers 115 are electrically interconnected to FPU 111 and the remainder of computer 100 operating in the foreground. The background operation of vector registers is not shown. Scalar registers f0 to f19, f21, f23, f25, f27, f29, and f31 are represented by a block 201. Scalar registers f20, f22, f24, f26, f28, and f30 are represented by blocks 206a, . . ., 206f, respectively. The six vector registers 115 are represented by blocks 204a, 204f, respectively. Data bus 114 is connected to the inputs of scalar registers f0 to f19, f21, f23, f25, f27, f29, and f31 (i.e. block 201). Data bus 114 is also alternately coupled to the inputs of scalar registers f20, . . ., f30 (i.e. blocks 206a, . . ., 206f) and to the inputs of vector registers F20 to F30 (i.e., blocks 204a, 204f) through switches 218a . . . 218f. The outputs of pairs of scalar and vector registers having the same address are connected to respective multiplexers (MUX's) 208a, . . ., 208f, i.e, the outputs of scalar register f20 and vector register F20 are connected to MUX 208a and the outputs of scalar register f30 and vector register F30 are connected to MUX 208f. During their execution, scalar type and vector type instructions are temporarily stored in an instruction register 210, which could be resident in IU 103. The contents of an address field in register 210 is coupled to an address decoder 212, which has a separate enable line 214 for each of scalar registers f0 to f19, f21, f23, f25, f27, f29, and f31, and for each pair of scalar and vector registers f20, F20 to f30, F30. For example, one line 214 controls both registers f20, F20, another line 214 controls both registers f22, F22, etc. In other words, the same addresses are mapped to each pair of scalar and vector registers f20, F20 to f30, F30. The outputs of MUX's 208 carrying scalar data are connected to an input A of FPU 111 and the outputs of MUX's 208 carrying vector data are connected to an input B of FPU 111. The output of FPU 111 loops back alternatively to the inputs of scalar registers f0 to f30 and vector registers F20 to F30 through switches 216a, . . . 216f. The contents of an operator field in register 210 is coupled to MUX's 208a, . . ., 208f and to switches 218a, . . ., 218f. Instruction register 210 controls the state of MUX's 208a, . . ., 208f, switches 216a, . . ., 216f, and switches 218a, . . ., 218f. When a regular instruction is loaded into register 210, MUX's 208a, . . ., 208f transmit data to input A of FPU 111, switches 216a, . . . 216f connect the output of FPU 111 to scalar registers f20, . . ., f30, and switches 218a, . . ., 218f connect data bus 114 to the inputs of scalar registers F20, . . ., F30. When an enhanced instruction is loaded into register 210, MUX's 208a, . . ., 208f transmit data to input B of FPU 111, switches 216a, . . . 216f connect the output of FPU 111 to vector registers F20, . . ., F30, and switches 218a, . . ., 218f connect data bus 114 to the inputs of vector registers F20, . . ., F30.

Figure 4A:
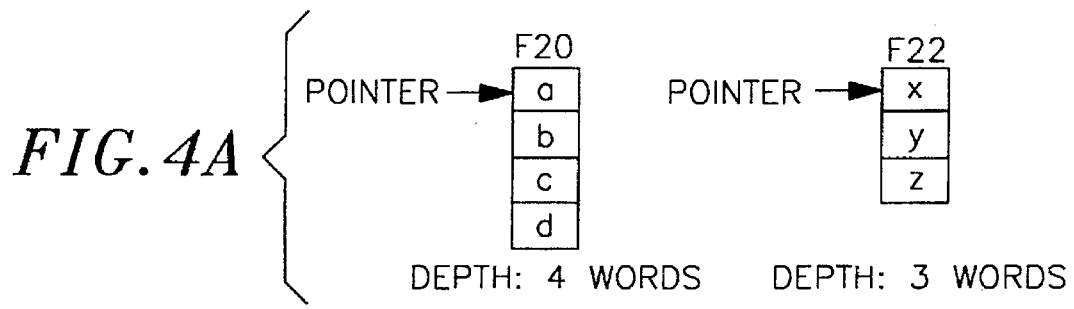
FIGS. 4(A–F) is a schematic diagram illustrating how the vector registers are controlled to sequence the transfer of vector data into and out of a vector register.
Figure 4B:
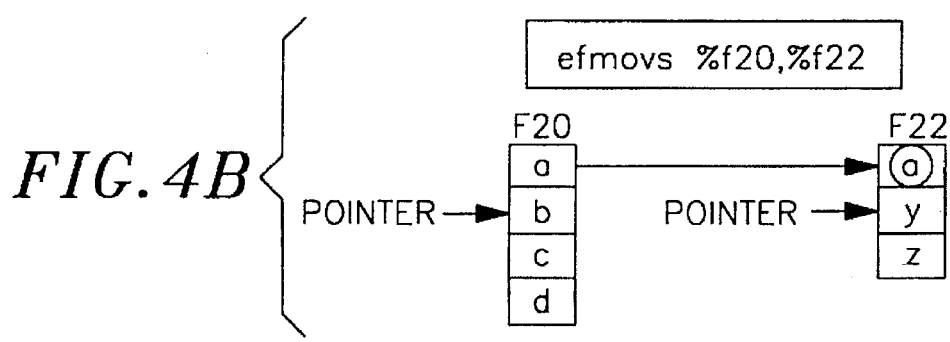
Figure 4C:
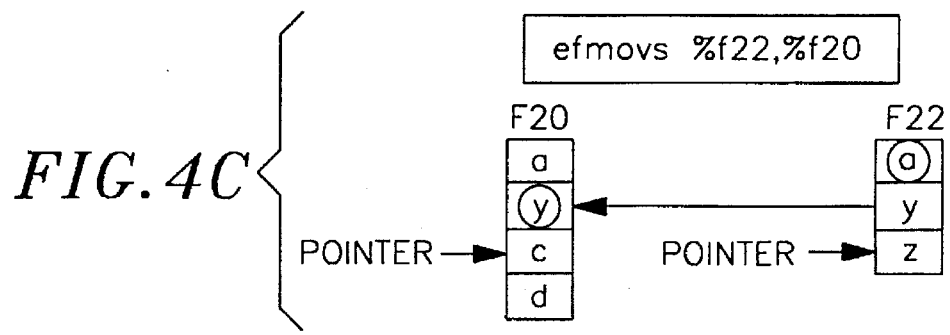
Figure 4D:
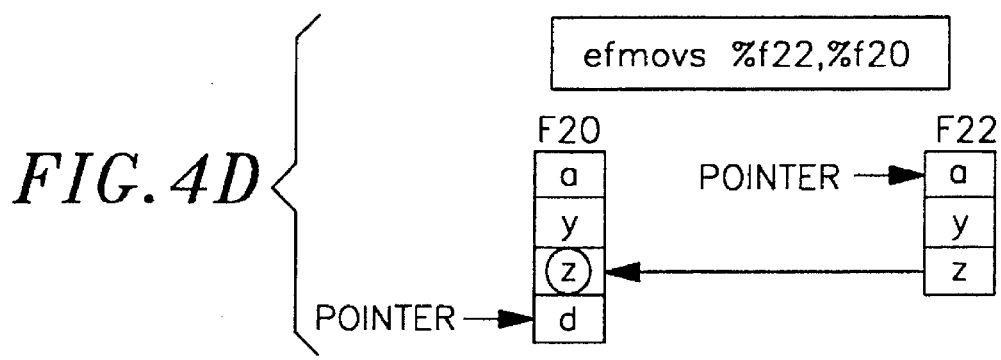
Figure 4E:
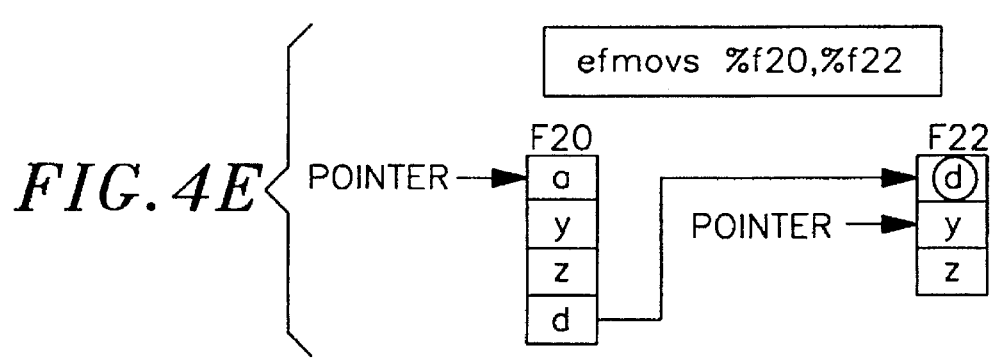
Figure 4F:
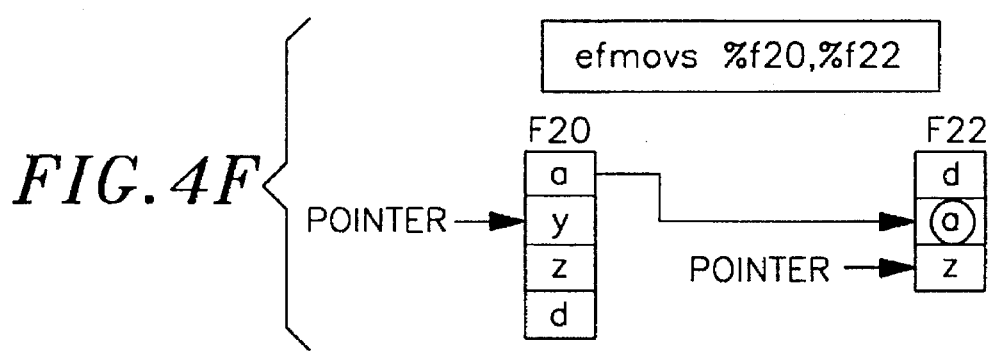

FIGS. 4A to 4F illustrate the control of the sequencing of vector registers 115 by means of a pointer in the course of the movement of vector data elements between vector registers F20 and F22 pursuant to an "efmovs" instruction. For the purpose of discussion, it is assumed that the depth of vector register f20 is four elements (words) and the depth of vector register f22 is three elements (words). In most actual cases the depth of the vector registers would be much greater. As illustrated in FIG. 4A, at the start of a vector operation the pointers are at the head of registers F20 and F22. Each time a vector data element is moved from one register to the other, the pointers of both registers advance. FIGS. 4B, 4E, and 4F, F20 is the source register and F22 is the destination register. In FIGS. 4C and 4D, F22 is the source register and F20 is the destination register. In FIG. 4C the pointer of F22 is at the end of the register and thus returns to the head of the register the next time data is moved, i.e., in FIG. 4D. In FIG. 4E the pointer of F20 is at the end of the register and thus returns to the head of the register the next time data is moved, i.e., in FIG. 4F. In each case, the transferred data element is marked with a circle.

FIG. 5 is a block diagram illustrating the logical design of each vector register. The vector registers are individually addressable, depending on the address field specified by the instruction of the vector operation, which always points to the head, i.e., first location (word), of the specified vector register. The element size, i.e., number of bits, of the cells or locations in the vector registers is also the same as the number of bits in the elements operated upon by FPU 111. As described below, the vector registers internally generate the addresses for accessing the other vector register locations, so no additional use of the capacity of IU 103 or additional time are required for this purpose.

Each vector register has a buffer 301, e.g., the previously mentioned RAM array, that is sixty-four words deep. The buffer 301 is coupled to DMA controller 108 and main memory 101 via memory bus 117 and can send data to and receive data from main memory 101. A pointer 302 is provided in each vector register for pointing to the location in buffer 301 from which data for the current instruction will be obtained or to which the results from FPU 111 are stored. The pointer is mapped to predetermined buffer locations and thus generates internal addresses within the vector register referenced to the head of the vector register. For example, in the preferred embodiment, the pointers of vector registers 206a to 206f are respectively mapped onto SPARC address space ASI=0×1, addresses 0×0500, 0×0504, 0×0508, 0×050C, 0×0510, and 0×0514.

Each vector register has it own depth register 306. When the associated pointer 302 of a vector register exceeds the value stored in the depth register 306, it returns to zero, i.e., the head of the register. Depth register 306 is mapped into an individual memory location. In the preferred embodiment, the depth registers 306 for vector registers 206a to 206f are respectively mapped to SPARC address space ASI=0×1, addresses 0×0518, 0×051C, 0×0520, 0×0524, 0×0528, 0×052C. Effectively, depth registers 306 function as a means for programming the size of the vector registers 206. For example, if a vector register is used as a source/destination for a vector operation and the combined length of the operands is less than sixty four words (e.g. thirty two words), depth register 306 can be set to thirty two words. For a read or write operation, pointer 302 is initialized to zero. As the read or write operation proceeds, pointer 302 advances. When pointer 302 exceeds the value of depth register 306 (i.e. maximum index thirty one or thirty two words), it returns to zero, pointing again to the head of the register.

Alternatively, pointer 302 of each vector register can be implemented by a modulo N counter. This feature is very helpful when one vector is small enough to fit in the vector register.

Reference numeral 308 identifies a read control logic for controlling read operations of the vector register. Whenever the vector register is used as a source of a vector type operation, read control logic 308 operates to output the data in buffer 301 designated by pointer 302 to multiplexer 208 (FIG. 2) and to advance pointer 302. If the corresponding read operation is a single precision operation, read pointer 302 is advanced one location. If the corresponding read operation is a double precision operation, read pointer 302 is advances two locations. The same is true for DMA transfer to the main memory in the background.

Reference number 310 identifies a write control logic 304 for controlling write operations of the vector register. Whenever the vector register is used as a designation of a vector type operation, the write control logic 310 operates to store incoming data into buffer 301 at the location designated by pointer 302 and to advance pointer 302. If the corresponding write operation is a single precision operation, pointer 302 is advanced one location. If the corresponding write operation is a double precision operation, pointer 302 is advanced two locations. The same is true for DMA transfer from main memory in the background.

Buffer 301 is coupled to memory bus 117. Data is transferred between buffer 301 and main memory 101 by direct memory access through memory bus 117. The vector registers are loaded by executing a DMA from main memory to the vector registers. When this operation is executed, IU 103 sets up the DMA control registers. For example, the ASI and location of the head of the vector register are written into the "Source/Destination ASI" register and the "Source Address" register, the address of the head of the specified vector register is written to the "Destination Address" register, the size of the array is written to the "Byte Count" register. After these registers are set up, IU 103 signals DMA controller 108 to perform the DMA transfer. IU 103 is thereafter freed to execute the next instruction, and the DMA transfer is performed by DMA controller 108 in cooperation with write control logic 310 of the vector register. Unloading a vector register can be performed in a similar manner, with the exception that the head of the vector register address is written to the "Source Address" register, the memory address is written to the "Destination Address" register, and the DMA controller cooperates with read control logic 308.

The described embodiments of the invention are only considered to be preferred and illustrative of the inventive concept; the scope of the invention is not to be restricted to such embodiments. Various and numerous other arrangements may be devised by one skilled in the art without departing from the spirit and scope of this invention.

APPENDIX A

Finite Impulse Response (FIR) Filter

This shows the inner loop of a FIR filter with a kernel (impulse response) with number of coefficients much less than 64, the maximum depth of the FIFO. This illustrates the use of very short FIFOs as temporary accumulators. Not shown is delivery of final result to memory or manipulation of FIFO pointers in preparation for calculation of next output or final calculation of last steps of calculating output or fetching of new input data via DMA.

Input data is in FIFO A (alternating with FIFO B in outer loop, not shown here). For input data sequences longer than 64 samples, the depth of FIFO A & B would be set to 64, except for the last pass, when they would be set to the amount of the remaining data.

Coefficients of the filter response are in FIFO C. Its depth is set to the number of coefficients. As each coefficient is used a pointer to it is incremented so as to point to the next coefficient. When the pointer exhausts the assigned depth of the FIFO, it rolls over to zero and the process is ready to begin again with the first coefficient.

FIFOs E & F are used as temporary accumulators with their depth set to 2. The inner loop is in "unrolled" form with four products being formed and accumulated each pass. When two products have been placed in either FIFO, its pointer rolls over to zero and points to the first product. Conventional FPU registers are used to complete the accumulation of products process.

*FPU operations*

-continued

| | |
|---|---|
| $f[A] * f[C] \to f[E]$ | product 1 |
| $f[A] * f[C] \to f[F]$ | product 2 |
| $f[A] * f[C] \to f[E]$ | product 3 |
| $f[A] * f[C] \to f[F]$ | product 4 |
| $f[E] * f[F] \to f1$ | sum products 1 & 2 |
| $f[E] + f[F] \to f2$ | sum products 3 & 4 |
| $f0 + f1 \to f0$ | add summed product pair to running total |
| $f0 + f2 \to f0$ | add summed product pair to running total |

Infinite Impulse Response (IIR) Filter

This shows the inner loop of processing data through a common unit second order IIR filter, a factored biquad. Input data is in FIFO A (alternating with FIFO B in outer loop, not shown here). Coefficients reside in general floating point registers—f11, f12, f13, f14. Products are formed and accumulated in general floating point registers—f0, f1, f2, f3. Output data is in FIFO C (alternating with FIFO D in outer loop, not shown here).

A distinguishing feature of IIR filters that can be difficult to handle in computing mechanisms that are designed to handle vectors is the reuse of some previous outputs as well as some previous inputs in calculating the next output.

The annotation of this calculation sequence reflects the calculation of output y(k) using input data x(k), x(k−1), x(k−2) and previous outputs y(k−1), y(k−2). At the start of the loop, the pointer of FIFO A points to x(k−2) and the pointer of FIFO C points to y(k−2). These are the oldest inputs and oldest outputs to be used in the computation of this output. Because this vector FPU is coupled with a general purpose computer, it is easy to maintain a copy of the oldest input and output pointer in the general registers, increment it after each output has been formed and move the pointers in FIFO A & C so that they will point to x(k−1) and y(k−1), which will be the oldest inputs and outputs to be used in the computation of the next output.

Not shown is delivery of final results to memory or loading coefficients of another biquad to be applied to the current sequence of outputs or initiation of DMA to treat those outputs as new inputs.

| | |
|---|---|
| $f[A] * f12 \to f0$ | $x(k-2) * a2$ |
| $f[A] * f11 \to f1$ | $x(k-1) * a1$ |
| $f[C] * f14 \to f2$ | $y(k-2) * b2$ |
| $f[C] * f13 \to f3$ | $y(k-1) * b1$ |
| $f0 + f1 \to f0$ | $x(k-2) * a2 + x(k-1) * a1$ |
| $f2 + f3 \to f2$ | $y(k-2) * b2 + y(k-1) * b1$ |
| $f[A] + f0 \to f0$ | $x(k) + x(k-1) * a1 + x(k-2) * a2$ |
| $f0 + f2 \to f[C]$ | output $y(k) =$ |
| | $x(k) + x(k-1) * a1 + x(k-2) * a2 -$ |
| | $(y(k-1) * a1 + y(k-2) * a2)$ | increment pointer copy store copy in FIFO A & C pointer—next pass of loop will produce x(k−1) from f[A] and y(k−1) from f[C].

APPENDIX B

Homogeneous Coordinate Transform—Dot Product Formulation for Graphics Including Page Composition And Animation $$[x\,y\,z\,w] \; * \; \begin{vmatrix} m11 & m12 & m13 & m14 \\ m21 & m22 & m23 & m24 \\ m31 & m32 & m33 & m34 \\ m41 & m42 & m43 & m44 \end{vmatrix} = [x'\,y'\,z'\,w']$$

$$x' = x*m11 + y*m21 + z*m31 + w*m41$$
$$y' = x*m12 + y*m22 + z*m32 + w*m42$$
$$z' = x*m13 + y*m23 + z*m33 + w*m43$$
$$w' = x*m14 + y*m24 + z*m34 + w*m44$$

The submatrix

|m11 m12 m13|
|m21 m22 m23|
|m31 m32 m33| provides any combination of rotation and size change desired of the graphic objects.

The submatrix

|m41 m42 m43 | provides position translation of the graphic objects.

The submatrix ||m14|
|m24|
|m34| provides change in perspective or projection of 3D space onto 2D viewing plane in cooperation with the matrix element m44.

The submatrix

|m44| provides image enlargement or reduction in the 2D viewing plane.

The matrix is used to transform vertices that define the graphic object. Where shading or color interpolation is added to the graphic object, the matrix is used to transform control points, usually equally spaced along edges between vertices, to corresponding view points, usually unequally spaced to maintain correct perspective.

After the homogeneous coordinate transforms are done, normalization of each vertex and view control point, [x'/w' y'/w' z'/w'] reduces defining points to perspective view coordinates and the details of filling in the objects and masking parts of objects blocked from view by closer objects commences.

For animation, all objects that move must go through this process for each viewing frame.

Homogeneous Coordinate Transform Steps

Multiply row vector describing one vertex of a three-dimensional object by transformation matrix to produce row vector representing equivalent vertex in selected viewing space.

Vectors are four elements. Matrices are 16 elements. The small size makes it difficult for traditional vector register machines or attached array processors to produce maximum performance. Overhead is amortized over fewer elements.

This shows the inner loop of the transform with input vertices in FIFO A (alternating with FIFO B) and output vertices in FIFO C (alternating with FIFO D). Transform coefficients of the matrix are loaded during initialization (not shown here) into the general floating registers, which are also used to hold intermediate results.

Each vertex quadruple is used four times. Moving the pointer back to the beginning of the vertex allows its reuse.

*FPU operations*

$f[A] * f4 \to f0 \quad x*m11$
$f[A] * f8 \to f1 \quad y*m21$
$f[A] * f12 \to f2 \quad z*m31$
$f[A] * f16 \to \quad w*m41$ store pointer copy in FIFO A pointer—4 accesses of f[A] moved its pointer to beginning of next vertex
storing copy of beginning of current vertex allows reuse of current vertex data $f0 + f1 \to f0$    add 1st 2 products
$f2 + f3 \to f2$    add 2nd 2 products
$f0 + f2 \to f[C]$    complete sum of products and output 1st result, $x'$ $f[A] * f5 \to f0 \quad x*m12$
$f[A] * f9 \to f1 \quad y*m22$
$f[A] * f13 \to f2 \quad z*m32$
$f[A] * f17 \to f3 \quad w*m42$ store pointer copy in FIFO A pointer $f0 + f1 \to f0$    add 1st 2 products
$f2 + f3 \to f2$    add 2nd 2 products
$f0 + f2 \to f[C]$    complete sum of products and output 2nd result, $y'$ $f[A] * f6 \to f0 \quad x*m13$
$f[A] * f10 \to f1 \quad y*m23$
$f[A] * f14 \to f2 \quad z*m33$
$f[A] * f18 \to f3 \quad w*m43$ store pointer copy in FIFO A pointer $f0 + f1 \to f0$    add 1st 2 products
$f2 + f3 \to f2$    add 2nd 2 products
$f0 + f2 \to f[C]$    complete sum of products and output 3rd result, $z'$ $f[A] * f7 \to f0 \quad x*m14$
$f[A] * f11 \to f1 \quad y*m24$
$f[A] * f15 \to f2 \quad z*m34$
$f[A] * f19 \to f3 \quad w*m44$ increment pointer copy by 4 to point to next vertex FIFO A pointer already points to next vertex because FIFO A was accessed 4 times $f0 + f1 \to f0$    add 1st 2 products
$f2 + f3 \to f2$    add 2nd 2 products
$f0 + f2 \to f[C]$    complete sum of products and output 4th result, $w'$ This inner loop is repeated until exhaustion of the FIFO is detected by the match of the FIFO A pointer and the FIFO A depth.

When exhaustion is detected, the control mechanism will read register asr18 and examine status bits to determine when the DMA that was loading FIFO B concurrently with the processing of FIFO A completes.

When completion is detected, the control mechanism will store a code into other bits of asr18 that signal the next DMA in the chain of DMA_0 controller operations to begin and to start a new load of FIFO A with vertex data that follows that already in FIFO B.

The control mechanism will read register asr19 and examine status bits to determine when the DMA that was storing FIFO D concurrently with the calculation of results in FIFO C completes. FIFO D contained results prior in order to those calculated in FIFO C.

When completion is detected, the control mechanism will store a code into other bits of asr19 that signal the next DMA in the chain of DMA_1 controller operations to begin and start a new store of FIFO C with results from the calculation inner loop just completed.

The pointer copy is zeroed and processing of FIFO B inputs begins with results to FIFO D.

APPENDIX C

Motion Control Loop

Key calculation in motion control loop is Proportional Integral correction:

Proportional—correction is proportional to current error—simple feedback.

Integral—correction is proportional to integral of error—cancel bias or offset.

Example

You shoot at clay pigeons moving across your field of vision with a rifle loaded with tracer shells.

Initially you point toward where they first appear and miss.

You estimate by how much you miss and move your aim proportionally.

After a while you notice that you're tracking the clays and following them in an arc but always just missing them by a small amount.

You throw in a little more correction than you otherwise would based on the size of that lag and eventually start hitting the clays.

Use RC integrator.

$S(k) = (1-a)*S(k-1) + a*E(k)$

What's a Resistor Capacitor integrator?

As current flows into or out of node from source, charge and therefore voltage across the resistor and capacitor increases or decreases.

If no new current, charge bleeds off through resistor and voltage slowly decreases—"forgetful memory."

Equation is digital equivalent of normalized Sum of Errors for each measurement period, k.

If error fluctuates around zero, S(k) will jiggle around small values.

If there's an offset in the error, that will get added in every time even though S(k) will jiggle, it will get larger and larger in magnitude until the correction based on S(k) starts cancelling the offset.

Equivalent time constant of integrator is measurement period/LOGe(1/(1-a))

Make correction track current error and integral of error $C(k) = p*E(k) + d*S(k)$ Basic equation—correction proportional to error and proportional to integral or sum of error $C(k) = (p+d*a).E(k) + (d*(1-a)).S(k-1)$ Combining terms allows C(k) to be calculated from E(k) and S(k–1) without having to wait for S(k) to be calculated. Controls with same sample rate are grouped Error inputs, corresponding integrator values, corrections and coefficients.

Grouping allows loop control instructions to be amortized over several control channels.

May permit masking of memory access latency by some processing of previous inputs.

| CONVENTIONAL | WITH FIFO/DMA |
|---|---|
| load next channel's E(k) -> f0 | f[E] -> f0 get E(k) |
| wait for external memory response | |
| load coefficient (p + d*a) -> f4 | |
| wait for external memory response | |
| load coefficient (a) -> f6 | |
| wait for external memory response | |
| E(k) * (p + d*a) -> f4 | f0 * f[C] -> f4 E(k) * (p + d*a) |
| 1.0 – (a) -> f7 (1 – a) | |
| wait for external memory response | |
| load next channel's S(k – 1) -> f1 | f[A] -> f1 get S(k – 1) |
| E(k) * (a) -> f6 | f0 * f[C] -> f6 E(k) * (a) |
| wait for external memory response | |
| load coefficient (d*(1 – a)) -> f5 | |
| S(k – 1) * (1 – a) -> f7 | f1 * f[C] -> f7 S(k – 1) * (1 – a) |
| wait for external memory response | |
| S(k – 1) * (d*(1 – a)) -> f5 | f1 * f[C] -> f5 |
| | S(k – 1) * (d*(1 – a)) |
| f6 + f7 -> S(k) | f6 + f7 -> f[B] update S(k) |
| f4 + f5 -> C(k) | f4 + f5 -> f[D] output |
| store channel's updated S(k) | correction, C(k) |
| wait for external memory response | |
| store channel's correction, C(k) | |
| wait for external memory response | |
| repeat till all channels processed | repeat till all channels processed. |

What is claimed is:

1. A computer system comprising:

memory means for storing a first set of instructions for scalar type data processing, a second set of instructions for vector type data processing, individual scalar data elements upon which the instructions of the first set operate, and arrays of vector data elements upon which the instructions of the second set operate, the instructions in the first and second sets each having a type designating field and a register designating field;

a processing unit operating upon individual data elements responsive to the instructions stored in the memory means;

means for monitoring the type designating field and the register designating field of each instruction in, turn;

a plurality of scalar registers assigned addresses stored in the register designating field of the instructions, each scalar register having a depth of one element or less;

means for connecting the scalar registers between the memory means and to the processing unit to transfer data therebetween;

a plurality of vector registers assigned the same addresses as some of the scalar registers, such addresses being stored in the register designating field of the instructions so the vector registers are visible in the scalar register address space, each vector register having a depth of a plurality of elements;

means for connecting the vector registers between the memory means and to the processing unit to transfer data therebetween;

means responsive to the monitoring means in the presence of a scalar type instruction for transferring an individual element of scalar data between the memory means and the processing unit via one or more registers designated by the instruction to operate upon the scalar data in the processing unit;

means responsive to the monitoring means in the presence of a vector type instruction for transferring an entire array of vector data between the memory means and the processing unit via one or more vector registers designated by the instruction to operate upon the vector data in the processing unit, wherein the depth of the designated vector register is M elements long, the array is X*M+N elements long, where M is larger than N, the means for transferring an entire array comprising means for transferring M element X times and means for transferring N elements one time; and means for controlling the vector registers to sequence the transfer of vector data between the memory means and the processing unit to occur one element at a time until the entire array has been processed.

2. The computer system of claim 1, in which the controlling means comprises for each designated vector register means for creating a pointer that designates an element in the vector register to be accessed, a depth register, means preparatory to transferring an array of vector data to or from the vector register for loading the size of the array into the depth register and setting the pointer in the vector register at a starting element, means for accessing the element of the vector register designated by the pointer to transfer data to or from the vector register, means for advancing the pointer each time an element is transferred to or from the vector register, and means for comparing the pointer position with the size in the depth register to determine when all the elements of data have been transferred.

3. A computer system comprising:

memory means for storing vector data comprising arrays of data elements;

a processing unit operating upon the vector data stored in the memory means one element at a time;

a plurality of addressable vector registers connected between the memory means and the processing unit to transfer arrays of vector data therebetween, each vector register having a depth of a plurality of elements;

first means for transferring vector data between one or more of the vector registers and the processing unit to operate upon the vector data in the processing unit in the foreground;

second means for transferring vector data between one or more of the vector registers and the memory means concurrently with the first means to make available vector data in the background;

means for controlling the vector registers to sequence the transfer of vector data between the memory means and the processing unit to occur one element at a time until an entire array has been processed;

a plurality of addressable scalar registers for storing data during operation of the processing unit;

means for mapping to each vector and scalar register an address applicable to both the scalar and vector instructions; and means for accessing the registers during execution of the scalar and vector instructions.

4. The computer system of claim 3, in which the plurality of vector registers comprise first, second, and third registers, the first transferring means comprises means for transferring in the order recited unprocessed vector data from the first register to the processing unit, processed vector data from the processing unit to the second register, intermediate processed vector data from the second register and unprocessed vector data from the third register to the processing unit, and processed vector data from the processing unit to one of the registers other than the second and third registers.

5. The computer system of claim 4, in which the first transferring means additionally comprises means for transferring a scalar data element to the processing unit with the unprocessed vector data from the first register to multiple the scalar data element and the unprocessed vector data in the processing unit, thereby forming the intermediate processed vector data.

6. The computer system of claim 4, in which the plurality of vector registers additionally comprise fourth, fifth, and sixth registers, the second transferring means comprises means for transferring in the order recited processed vector data from the fourth register to the memory means, unprocessed vector data from the memory means to one of the fourth, fifth, or sixth registers, and unprocessed vector data from the memory means to another of the fourth, fifth, or sixth registers.

7. The computer system of claim 3, in which the plurality of vector registers comprise first, second, third, and fourth registers, the arrays are larger than the depth of the vector registers so the vector registers cycle between so the foreground and the background as they become full, the first transferring means comprises means during odd cycles for transferring unprocessed vector data from the first register to the processing unit and processed vector data from the processing unit to the second register and means during even cycles for transferring unprocessed vector data from the third register to the processing unit and processed vector data from the processing unit to the fourth register and the second transferring means comprises means during odd cycles for transferring processed data from the fourth register to the memory means and unprocessed data from the memory means to the third register and means during even cycles for transferring processed data from the second register to the memory means and unprocessed data from the memory means to the first register.

8. The computer system of claim 7, in which the depth of the vector registers is m elements, the array is x*m+n elements long, where m is larger than n, and the first and second transferring means cycle x+1 times to process all the elements in the array.

9. A computer system comprising:

memory means for storing vector data comprising arrays of data elements;

a processing unit operating upon the vector data stored in the memory means one element at a time;

first, second, and third vector registers connected between the memory means and the processing unit to transfer arrays of vector data therebetween, each vector register having a depth of a plurality of elements;

means for first transferring unprocessed vector data from the first register to the processing unit;

means for second transferring processed vector data from the processing unit to the second register after the first transfer;

means for third transferring processed vector data from the second register and unprocessed vector data from the third register to the processing unit after the second transfer;

means for fourth transferring processed vector data from the processing unit to one of the registers other than the third register after the third transfer; and means for controlling the vector registers to sequence the transfer of vector data between the memory means and the processing unit to occur one element at a time until the entire arrays have been processed.

10. A computer system comprising:
- memory means for storing vector data comprising arrays of data elements;
- a processing unit operating upon the vector data stored in the memory means one element at a time;
- first and second vector registers connected between the memory means and the processing unit to transfer arrays of vector data therebetween, each vector register having a depth of a plurality of elements;
- means for first transferring unprocessed vector data from the first register to the processing unit;
- means for second transferring processed vector data from the processing unit to the second register after the first transfer;
- means for third transferring processed vector data from the second register to the processing unit after the second transfer;
- means for fourth transferring processed vector data from the processing unit to one of the registers other than the second register after the third transfer; and
- means for controlling the vector registers to sequence the transfer of vector data between the memory means and the processing unit to occur one element at a time until the entire arrays have been processed.

11. A computer system for executing scalar type instructions having data elements as operands and vector type instructions having data elements and arrays of data elements as operands, scalar type instructions and vector type instructions each having an instruction type designating field and an operand register designating field, the instructions and data elements being stored in a main memory, comprising:
- a plurality of scalar registers identified by addresses stored in the operand register designating field of the instructions, each scalar register having a depth of one data element;
- a plurality of vector registers identified by the same addresses as some of the scalar registers, such addresses being stored in the operand register designating field of the instructions wherein the plurality of vector registers are visible in the scalar register address space, each vector register having a depth of a plurality of data elements;
- processing means for executing the scalar type instructions and the vector type instructions, said processing unit including
- means for decoding the instruction type designating field and the operand register designating field of each instruction to select at least one scalar register as an operand if the instruction is a scalar type instruction and to select at least one vector register if the instruction is a vector type instruction, and
- means for storing intermediate processing results of vector type instructions in selected ones of the plurality of vector registers;
- bus control means coupled to the main memory, the plurality of scalar registers, and the plurality of vector registers for transferring data elements between the plurality of scalar registers and the main memory, and for transferring entire arrays of data elements between the plurality of vector registers and the main memory, wherein data transfers to and from the plurality of scalar registers and to and from the plurality of vector registers are performed concurrently with the processing means executing instructions; and wherein the instruction type designating field is used to distinguish between arithmetic operations using data elements from the plurality of scalar registers or from the plurality of vector registers.

12. The computer system of claim 11, wherein the processing means performs different arithmetic operations on successive elements of an array of data elements stored in one of the plurality of vector registers.

13. The computer system of claim 11, wherein the processing means performs arithmetic operations on different sized arrays of data elements stored in at least two of the plurality of vector registers.

14. The computer system of claim 11, wherein the operand register designating field of an instruction specifies a selected one of the plurality of vector registers and a selected one of the plurality of scalar registers.

15. The computer system of claim 11, wherein each one of the plurality of vector registers is a first-in-first-out (FIFO) queue having a maximum depth of a predetermined number of data elements.

16. The computer system of claim 11, wherein each one of the plurality of vector registers includes a single pointer for referencing all of the plurality of data elements in the vector register.

17. The computer system of claim 11, wherein the vector type instructions include a load vector register instruction to write a plurality of data elements into a vector register from the main memory in a single instruction and a store vector register instruction to read a plurality of data elements from a vector register into the main memory in a single instruction.

18. The computer system of claim 11, wherein each one of the plurality of vector registers comprises:
- buffer means coupled to the bus control means for storing an array of data elements;
- pointer means coupled to the buffer means for referencing a selected location in the buffer means for storage or retrieval of a data element;
- means for specifying the number of data elements stored in the buffer means;
- read control means for controlling data transfers from the buffer means; and
- write control means for controlling data transfers to the buffer means.

19. The computer system of claim 18, wherein the buffer means comprises a FIFO queue.

20. In a computer system having a main memory coupled to a processing unit by a plurality of vector registers, each vector register having a depth of a plurality of elements, a method of processing vector data comprising the steps of:
- (a) storing arrays of data elements as vector data in the main memory;
- (b) transferring a first set of unprocessed vector data from the main memory to the processing unit via a first vector register;
- (c) processing the first set of unprocessed vector data one data element at a time into a first set of processed vector data;
- (d) transferring the first set of processed vector data from the processing unit to a second vector register;
- (e) transferring a second set of unprocessed vector data from the main memory to a third vector register;
- (f) transferring the first set of processed vector data from the second vector register and the second set of unprocessed vector data from the third vector register to the processing unit;

(g) processing the vector data from the second vector register and the third vector register one data element at a time into a second set of processed vector data; and (h) transferring the second set of processed vector data from the processing unit to a vector register other than the third vector register.

21. In a computer system having a main memory coupled to a processing unit by a plurality of vector registers, each vector register having a depth of a plurality of elements, a method of processing vector data comprising the steps of:

(a) storing arrays of data elements as vector data in the main memory;

(b) transferring a first set of unprocessed vector data from the main memory to the processing unit via a first vector register;

(c) processing the first set of unprocessed vector data one data element at a time into a first set of processed vector data;

(d) transferring the first set of processed vector data from the processing unit to a second vector register;

(e) transferring the first set of processed vector data from the second vector register to the processing unit;

(f) processing the vector data from the second vector register one data element at a time into a second set of processed vector data; and (g) transferring the second set of processed vector data from the processing unit to a vector register other than the second vector register.

* * * * *